United States Patent
Misu et al.

(10) Patent No.: US 9,809,165 B1
(45) Date of Patent: Nov. 7, 2017

(54) SYSTEM AND METHOD FOR MINIMIZING DRIVER DISTRACTION OF A HEAD-UP DISPLAY (HUD) IN A VEHICLE

(71) Applicant: HONDA MOTOR CO., LTD., Minato-ku, Tokyo (JP)

(72) Inventors: Teruhisa Misu, Mountain View, CA (US); Hajime Yamada, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/208,223

(22) Filed: Jul. 12, 2016

(51) Int. Cl.
*B60Q 1/00* (2006.01)
*B60Q 9/00* (2006.01)
*B60K 37/02* (2006.01)
*B60R 1/00* (2006.01)
*G06K 9/00* (2006.01)
*G06T 19/00* (2011.01)

(52) U.S. Cl.
CPC ............. *B60Q 9/00* (2013.01); *B60K 37/02* (2013.01); *B60R 1/00* (2013.01); *G06K 9/00791* (2013.01); *G06T 19/006* (2013.01); *B60K 2350/2052* (2013.01); *B60R 2300/205* (2013.01); *B60R 2300/80* (2013.01); *B60R 2300/8086* (2013.01)

(58) Field of Classification Search
CPC ........ G08G 1/166; G08G 1/167; G08G 1/165; B60Q 9/008
USPC .... 340/425.5, 435, 436, 459, 461, 462, 901, 340/903, 905, 995.19, 995.24; 701/31.4, 701/36; 382/103, 104
See application file for complete search history.

(56) References Cited

U.S. PATENT DOCUMENTS

| | | | |
|---|---|---|---|
| 6,876,307 B1 | 4/2005 | Spitzer et al. | |
| 7,639,148 B2 | 12/2009 | Victor | |
| 2006/0151223 A1 | 7/2006 | Knoll | |
| 2010/0292886 A1* | 11/2010 | Szczerba | G01C 21/365 701/31.4 |
| 2012/0306637 A1 | 12/2012 | McGough et al. | |
| 2013/0321628 A1 | 12/2013 | Eng et al. | |
| 2016/0082840 A1* | 3/2016 | Yoshida | B60K 35/00 701/36 |

FOREIGN PATENT DOCUMENTS

| | | |
|---|---|---|
| CN | 102910130 A | 2/2013 |
| EP | 1 478 268 B1 | 6/2012 |
| JP | 2002-079849 A | 3/2002 |
| WO | WO 2014/095071 A1 | 6/2014 |

* cited by examiner

*Primary Examiner* — Kerri McNally
*Assistant Examiner* — Sharmin Akhter
(74) *Attorney, Agent, or Firm* — Arent Fox LLP

(57) ABSTRACT

A method and vehicle system for reducing driver distractions caused by a head-up display (HUD). The HUD projects one or more graphic elements onto a windshield in view of a driver of the vehicle. The vehicle system determines a content status of the one or more projected graphic elements. The vehicle system detects one or more objects within an environment of the vehicle. The vehicle system determines whether the content status of the one or more projected graphic elements satisfies a driver distraction criterion. The vehicle then notifies the driver of the one or more detected objects when the content status of the one or more projected graphic element satisfies the driver distraction criterion.

13 Claims, 6 Drawing Sheets

SYSTEM AND METHOD FOR MINIMIZING DRIVER DISTRACTION OF A HEAD-UP DISPLAY (HUD) IN A VEHICLE

TECHNICAL FIELD

This disclosure relates generally to an augmented reality head-up display of a vehicle and, more particularly, to a system and method for reducing driver distractions caused by an augmented reality head-up display in a vehicle.

BACKGROUND

Augmented reality systems in vehicles may provide visual information to assist a driver of a vehicle in various driving situations. Augmented reality systems in vehicles may use, for example, a head-up display (HUD) for projecting graphic elements onto a windshield of the vehicle. However, augmented reality systems may themselves become a source of distraction. A driver may focus too much on the graphic elements projected by the HUD. For example, when a vehicle is approaching an intersection, a driver of the vehicle may focus his or her attention solely towards a graphic element (e.g., icon) representing a navigation instruction (e.g., turn left) projected by the HUD on the windshield of the vehicle. As a result, the driver may inadvertently drive the vehicle into the intersection without noticing surrounding road conditions such as, but not limited to, a red light, a pedestrian crossing the intersection, and/or other vehicle in the intersection. Thus, there is a need in the art for a system and method for compensating for driver distraction caused by an augmented reality HUD system in a vehicle.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect, the disclosure provides a method for reducing driver distraction. The method may include projecting, by a HUD, one or more graphic elements onto a windshield in view of a driver of the vehicle. The method may also include determining a content status of the one or more projected graphic elements. The method may further include detecting one or more objects within an environment of the vehicle. The method may further include notifying the driver of the one or more detected objects when the content status satisfies a distraction criterion.

In another aspect, the present disclosure provides a vehicle system for reducing driver distraction. The vehicle system may include a head-up display (HUD) for projecting one or more graphic elements onto a windshield in view of a driver of the vehicle. The vehicle system may also include at least one sensor for detecting one or more objects within an environment of the vehicle. The vehicle system may further include a memory for storing instructions and a processor communicatively coupled to the HUD, the at least one sensor, and the memory. The processor may determine a content status of the one or more graphic elements projected by the HUD. The processor may also notify the driver of the one or more objects detected by the at least one sensor when the content status satisfies a distraction criterion.

In another aspect, the present disclosure provides a non-transitory computer-readable medium for reducing driver distraction. The non-transitory computer-readable medium may include code for projecting one or more graphic elements onto a windshield in view of a driver of the vehicle. The non-transitory computer-readable medium may also include code for determining a content status of the one or more projected graphic elements. The non-transitory computer-readable medium may further include code for detecting one or more objects within an environment of the vehicle. The non-transitory computer-readable medium may further include code for notifying the driver of the one or more detected objects when the content status satisfies a distraction criterion.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale, and certain figures may be shown in exaggerated or generalized form in the interest of clarity and conciseness. The disclosure itself, however, as well as a preferred mode of use, further features and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other features that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," or a connection by which entities are "operatively connected," is one in which signals, physical communications, and/or logical communications may be sent and/or received. An operable connection may include a wireless interface, a physical interface, a data interface, and/or an electrical interface.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, personal watercraft, and aircraft. In some cases, a motor vehicle includes one or more engines.

Figure 1:
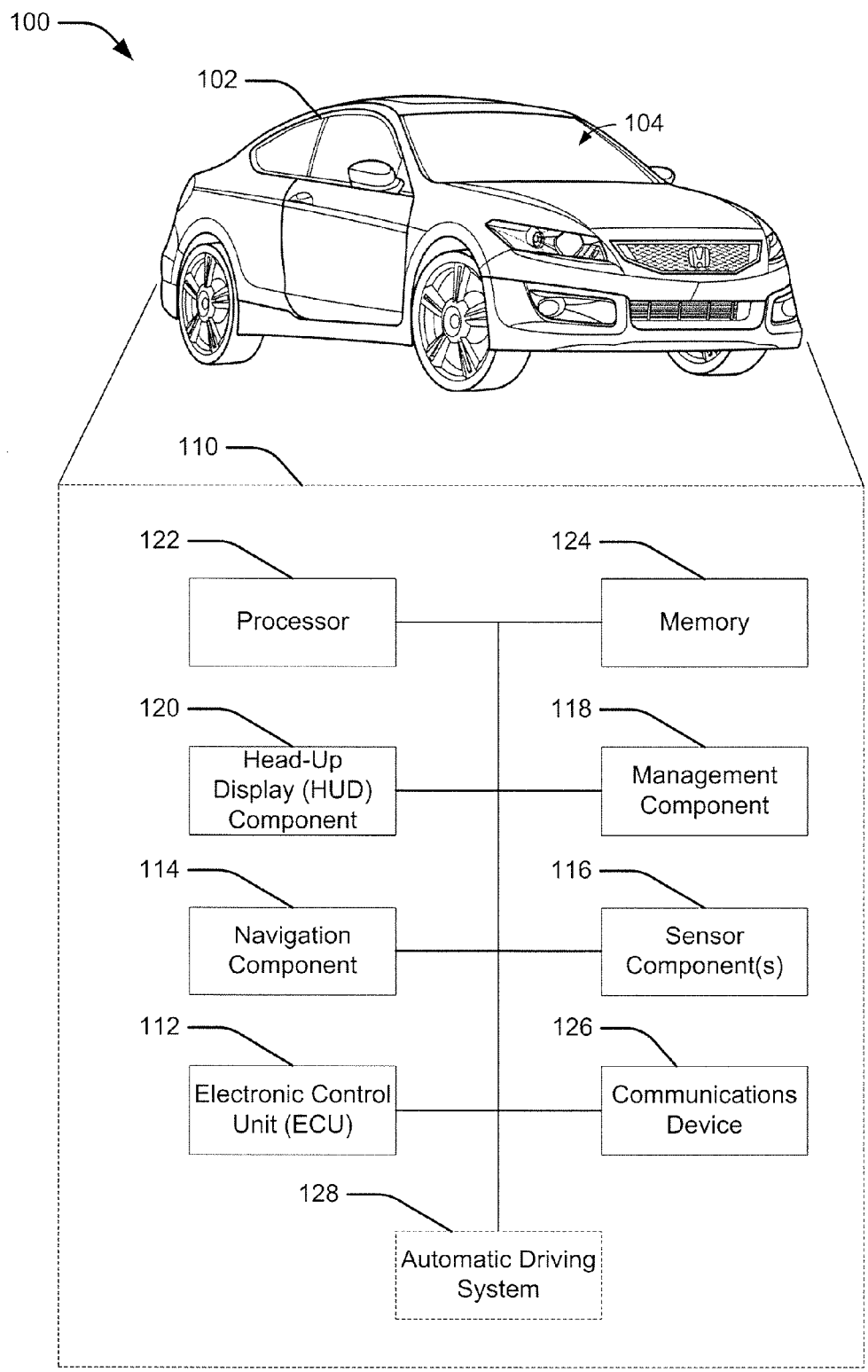
FIG. 1 illustrates a schematic view of an example operating environment of a vehicle notification system in accordance with aspects of the present disclosure.

Generally described, the present disclosure provides for compensating for driver distraction caused by a HUD system of a vehicle. Turning to FIG. 1, a schematic view of an example operating environment 100 of a vehicle notification system 110 and example methods according to an aspect of the disclosure is provided. The vehicle notification system 110 may reside within vehicle 102. The components of the vehicle notification system 110, as well as the components of other systems, hardware architectures, and software architectures discussed herein, may be combined, omitted, or organized into various implementations.

The vehicle 102 may generally include an electronic control unit (ECU) 112 that operably controls a plurality of vehicle systems. The vehicle systems may include, but are not limited to, the vehicle notification system 110, among others, including vehicle HVAC systems, vehicle audio systems, vehicle video systems, vehicle infotainment systems, vehicle telephone systems, and the like. The vehicle notification system 110 may include a processor 122 and a memory 124 that communicate with a head-up display (HUD) component 120, a navigation component 114, one or more sensor components 116, and a management component 118.

The ECU 112 may include an internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle notification system 110.

The vehicle 102 may further include a communications device 126 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 126 of the vehicle 102 may be operably connected for internal computer communication via a bus (e.g., a CAN or a LIN protocol bus) to facilitate data input and output between the ECU 112 and vehicle features and systems.

The vehicle 102 may include one or more sensor components 116 for detecting or analyzing the surroundings of vehicle 102, a surrounding environment of the vehicle 102, or one or more objects within an operating environment, such as extra-vehicular objects (e.g., objects outside of the vehicle). For example, sensor component 116 may track, monitor, detect, sense, or capture one or more objects such as, but not limited to, buildings, landmarks, pedestrians, bicyclists, other vehicles, obstructions, obstacles, debris, potholes, road surface conditions (e.g., ice, rain, sand and/or gravel), traffic conditions, and/or traffic signs (e.g., traffic lights, speed limit signals, stop signs, railroad crossings and/or trains). The sensor component 116 may include an image capture device, an image acquisition device, a radar sensor, a light detection and ranging (LIDAR) sensor, a laser sensor, a video sensor, and/or a movement sensor, among other elements. Further, the sensor component 116 may detect one or more object attributes such as, but not limited to, a proximity of an object to a vehicle, a type of object or class of object (e.g., signage, vehicle, pedestrian), and/or an angle of an object from a trajectory of a vehicle or roadway.

The vehicle 102 may include navigation component 114 for receiving or identifying an origin location (e.g., point A) and one or more destination locations (e.g., point B). The navigation component 114 may calculate or determine one or more routes from point A to point B, for example. The navigation component 114 may include a Global Position System (GPS) transceiver (not shown) for receiving transmissions from GPS satellites for use in determining a location of the vehicle 102. The navigation component 114 may further include a maps/landmarks database (not shown) that may supply the navigation component 114 with information such as, but not limited to, road network data, destination data, landmark data, points of interest data, and/or street view data, among other data. The maps/landmarks database may be accessed by the navigation component 114 to determine a location of a destination in order to calculate or determine one or more routes from the vehicle 102 to the destination. A route of the one or more routes may include one or more route portions. One or more portions of the route may include one or more navigation instructions or navigation maneuvers associated with one or more road segments or intersections of road segments. For example, one or more portions of the route may include one or more turns, navigation maneuvers, road segments, intersections, or other elements along the route. The navigation component 114 may identify one or more of these elements along the route and issue one or more navigation commands or navigation instructions accordingly.

The vehicle 102 may include HUD component 120 for displaying graphic elements in view of a driver of vehicle 102 while the driver views an environment of the vehicle 102 through a windshield 104. In one or more aspects, the HUD component 120 may be any type of HUD such as, but not limited to, a vehicular volumetric HUD system, a 3-D HUD, a variable distance HUD, or an augmented reality HUD (AR-HUD). For example, the HUD component 120 may include one or more projectors (not shown) that project a graphic element on a frontal focal plane in view of the driver while the driver views the environment through the windshield 104. Additionally, the HUD component 120 may include one or more projectors (not shown) that project a graphic element on a ground-parallel focal plane in view of the driver while the driver views the environment through the windshield 104. The graphic elements projected by the HUD component 120 may be a bitmap, may include a dot matrix structure, or may be a rectangular grid of pixels. Additionally, the HUD component 120 may project one or more portions of one or more graphic elements with different shading, transparency levels, colors, brightness, for example.

The vehicle 102 may further include a management component 118 for controlling operations of the HUD component 120. For example, in aspect, the management component 118 may receive one or more navigation commands or navigation instructions issued by the navigation component 114 via the bus, e.g., CAN bus. Similarly, in an aspect, the management component 118 may receive sensor data from sensor component 116 via the bus. The sensor data may include attributes of one or more objects detected by sensor component 116 in the environment of vehicle 102. In an aspect, the management component 118 may determine whether to instruct the HUD component 120, e.g., via the bus, to project one or more graphic elements representing the one or more navigation commands and/or the one or more detected objects. For example, in an aspect, the management component 118 may, e.g., according to a default setting stored in memory 124, instruct the HUD component 120 to project one or more graphic elements representing the one or more navigation commands or instructions. In an aspect, the HUD component 120 may project the one or more graphic elements representing the navigation commands or instructions in direct view of an occupant or driver of the vehicle 102. The types of graphic elements associated with the navigation function may include, for example, graphic elements that instruct the driver to continue on the current road (e.g., a straight line or arrow), to turn left or right onto an upcoming cross-road (e.g., a left/right arrow or line turning in the appropriate direction), and/or to enter, merge onto, or exit from a highway (e.g., a line or arrow indicating the appropriate path). The HUD component 120 may project any appropriate graphic element based on the navigation commands or navigation instructions issued by the navigation component 114.

Figure 2:
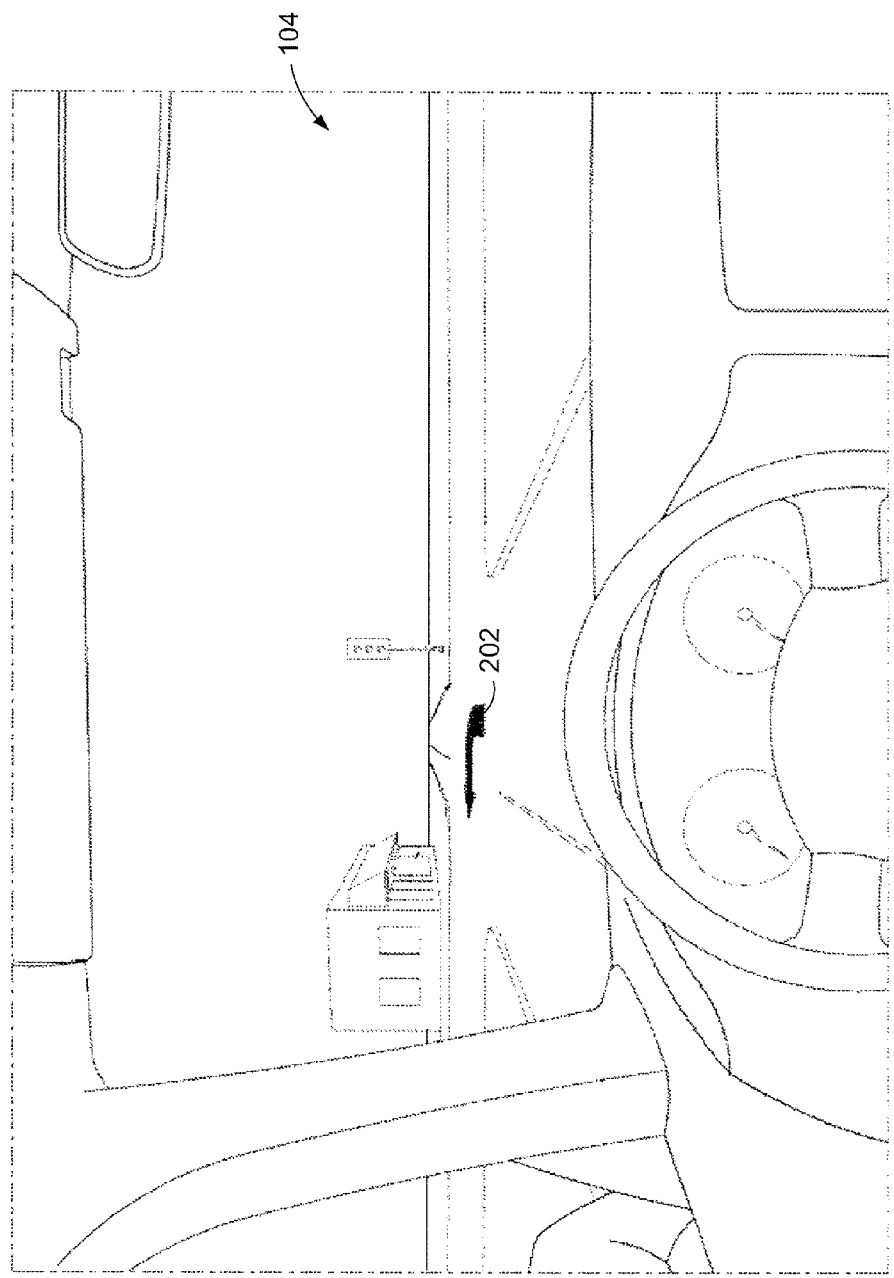
FIG. 2 illustrates an example view of a driver while driving a vehicle and an example first graphic element projected by a HUD system on a windshield of the vehicle in accordance with aspects of the present disclosure.

For example, referring to FIG. 2, the navigation command or navigation instruction issued by navigation component 114 (FIG. 1) may include a command or instruction to turn left onto an upcoming street. Accordingly, the HUD component 120 (FIG. 1) may project a left-hand turn graphic element 202 (e.g., a left arrow) onto the windshield 104 such that the graphic element 202 is projected in direct view of the driver of the vehicle 102 (FIG. 1) on the ground plane.

Referring again to FIG. 1, the management component 118 may also, according to the default setting, instruct the HUD component 120 to project one or more graphic elements representing one or more objects detected by sensor component 116. In an aspect, the management component 118 may instruct the HUD component 120 to project graphic elements representing objects such as, but not limited to, objects within a particular proximity to vehicle 102 and/or certain types or classes of objects. For example, the management component 118 may instruct the HUD component 120 to project graphic elements representing objects, e.g., pedestrians and/or vehicles, within an alert distance from the vehicle 102, but may not instruct the HUD component 120 to project graphic elements representing objects at a distance greater than the alert distance. Further, the management component 118 may instruct the HUD component 120 to project one or more graphic elements representing a certain type of object (e.g., pedestrians), but may not instruct the HUD component 120 to project graphic elements representing another type of objects (e.g., traffic conditions such as, but not limited to, traffic light status). In an aspect, the HUD component 120 may project the one or more graphic elements representing at least one object detected by the sensor component 116 on the windshield 104 such that, from a perspective of the driver, the one or more graphic elements are superimposed on the at least one detected object or superimposed on, e.g., a road, building, or other landmark adjacent to the at least one detected object. The types of graphic elements associated with the object function may include, for example, text or symbols such as, but not limited to, text "YIELDING" and/or an exclamation mark. The HUD component 120 may project any appropriate graphic element based on, e.g., the type or class of object detected by sensor component 116.

Additionally, or alternatively, the management component 118 may receive sensor data from the sensor component 116 indicating that no objects were detected in at least a portion of the environment of vehicle 102. In an aspect, the management component 118 may, according to the default setting, instruct the HUD component 120 to project one or more graphic elements (e.g., turn arrow) indicating that at least the portion of the environment of vehicle 102 is clear of objects (e.g., pedestrians) based on the received sensor data and thus, the vehicle 102 may proceed through the portion of the environment (e.g., a crosswalk to the left of vehicle 102).

Still referring to FIG. 1, in an aspect, the management component 118 may further instruct the HUD component 120 to project one or more additional graphic elements such as, but not limited to, graphic elements representing objects that are not included in the default setting stored in memory 124. In an aspect, for example, the management component 118 may determine a content status of the HUD component 120 and may instruct the HUD component 120 to project the one or more additional graphic elements when the determined content status of the HUD component 120 satisfies a distraction criterion. For example, in an aspect, the management component 118 may determine a level of contrast, a degree of animation, a size, and/or a number of graphic elements (e.g., representing navigation instructions and/or object notifications) being projected by the HUD component 120 (e.g., by default). The management component 118 may instruct the HUD component 120, e.g., via commands issued over the bus, to project the one or more additional graphic elements when the level of contrast, the degree of animation, the size, and/or the number of the one or more graphic elements being projected by the HUD component 120 meets or exceeds a threshold. For example, when the level of contrast, the degree of animation, the size, and/or the number of the one or more graphic elements being projected by the HUD component 120 meets or exceeds the threshold, then the driver may be too focused on (e.g., distracted by) the one or more graphic elements and the driver may not notice other objects in the environment of vehicle 102.

Figure 3:
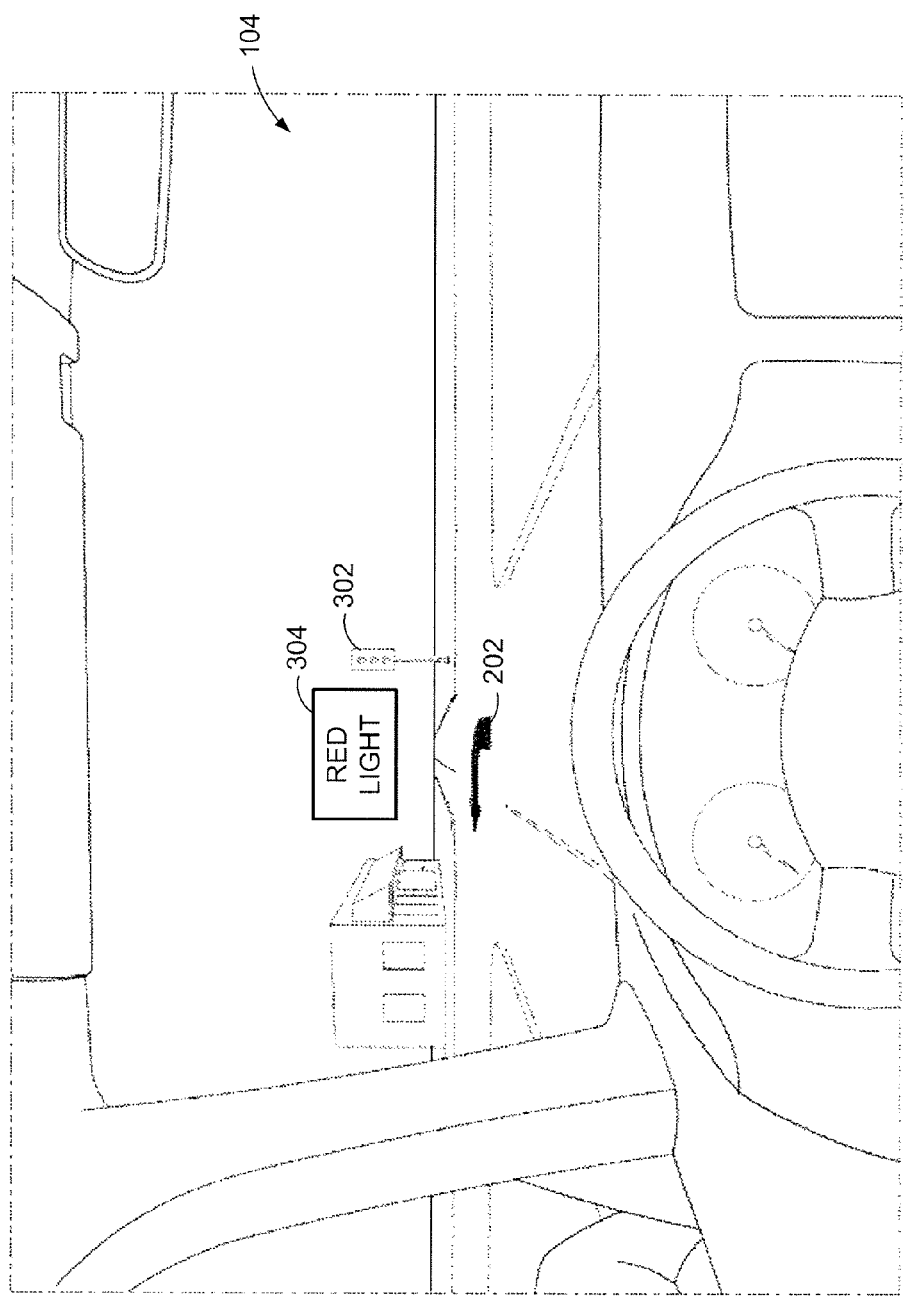
FIG. 3 illustrates an example view of a driver while driving a vehicle and an example second graphic element projected by a HUD system on a windshield of the vehicle for compensating for driver distraction caused by projection of a first graphic element by the HUD system, in accordance with aspects of the present disclosure.

For example, referring to FIG. 3, the HUD component 120 (FIG. 1) may be projecting the left-hand turn graphic element 202 onto the windshield 104 of vehicle 102 (FIG. 1). The sensor component 116 may detect a red light 302 in the environment of vehicle 102 (FIG. 1), however, a traffic light status may be not be included in the default setting stored in memory 124. In this example, the management component 118 may determine a content status of the left-hand turn graphic 202 and, when the content status satisfies the distraction criterion (e.g., a degree of animation of the left-hand turn graphic 202 meets or exceeds the threshold), the management component 118 may instruct the HUD component 120 (FIG. 1) to project an additional graphic element 304 (e.g., text "RED LIGHT") representing the red light 302 onto the windshield 104. In this way, the HUD component 120 (FIG. 1) may compensate for driver distraction caused by the projection of the left-hand turn graphic 202 onto the windshield 104 by alerting the driver of vehicle 102 of the detected red light 302.

Additionally, or alternatively, the management component 118 may instruct an automatic driving system 128 to perform a driverless maneuver when the content status satisfies the distraction criterion (for example, when the management component 118 determines the driver of vehicle 102 may be distracted by one or more graphic elements being projected by HUD component 120). The automatic driving system 128 may include a lane keeping assistance system, a collision warning system, or a fully autonomous driving system, among other systems.

Figure 4:
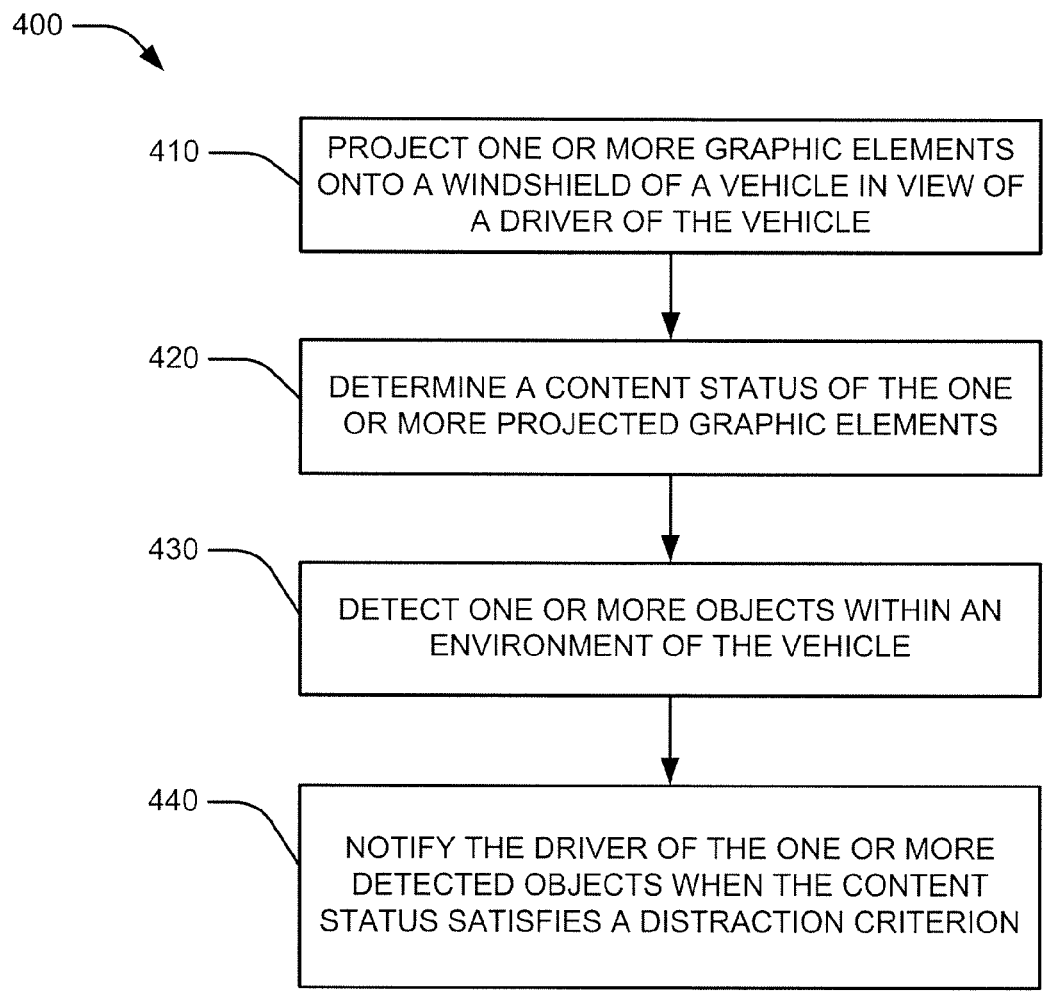
FIG. 4 illustrates a flowchart showing an example method of compensating for driver distraction caused by a HUD system in accordance with aspects of the present disclosure.

Referring now to FIG. 4, a method for compensating for driver distraction caused by a HUD in a vehicle according to an example aspect of the present disclosure will be discussed. FIG. 4 will be described with reference to the components of FIG. 1. Additionally, the method will be described with reference to algorithms, which may also be implemented with the system shown in FIG. 1 and described in conjunction therewith, and other systems and methods.

At block 410, the method 400 includes projecting one or more graphic elements onto a windshield of a vehicle in view of a driver of the vehicle. In an aspect, the HUD component 120 may project one or more graphic elements onto windshield 104 of vehicle 102 in direct view of the driver of the vehicle 102. In an aspect, for example, the management component 118 may receive navigation instructions or navigation commands from navigation component 114 via, e.g., a bus. The management component 118 may then instruct the HUD component 120 (e.g., according to the default setting) to project one or more graphic elements representing the received navigation instructions or navigation commands (e.g., a left-turn, right-turn, and/or straight arrow) onto the windshield 104 of the vehicle 102.

Additionally, or alternatively, the management component 118 may receive sensor data from sensor component 116 including attributes of one or more objects detected by sensor component 116 in the environment of vehicle 102. In an aspect, the management component 118 may instruct the HUD component 120 (e.g., according to the default setting) to project one or more graphic elements indicating a presence of at least of the one or more detected objects. For example, the sensor component 116 may detect at least one pedestrian located within the alert distance from vehicle 102 as well as a bicyclist located at a distance greater than the alert distance from vehicle 102. The management component 118 may then instruct the HUD component 120 to project one or more notifications (e.g., text "YIELDING," exclamation mark, and/or other text or symbol) representing the at least one detected pedestrian on the windshield 104 such that, from a perspective of the driver, the one or more notifications are superimposed on the at least one detected pedestrian or superimposed on, e.g., a road, building, or other landmark adjacent to the at least one detected pedestrian. However, the management component 118 may not instruct the HUD component 120 to project a graphic element representing the bicyclist because, e.g., the bicyclist is located at a distance greater than the alert distance from vehicle 102.

Additionally, or alternatively, the management component 118 may receive sensor data from sensor component 116 indicating that no objects were detected in a path of vehicle 102. For example, the sensor component 116 may determine that no other vehicles are approaching vehicle 102 in an opposite direction and that no pedestrians are walking in an intersection to the left of vehicle 102. In this example, the management component 118 may then instruct the HUD component 120 (e.g., according to the default setting) to project a color-coded path (e.g., a colored left turn arrow) on the windshield 104 to indicate to the driver that he or she may proceed to, e.g., turn left, at the intersection.

In another aspect, the management component 118 may instruct the HUD component 120 to project one or more graphic elements onto the windshield 104 that represent information that would otherwise be displayed on a dashboard of the vehicle 102. For example, the management component 118 may instruct the HUD component 120 to project one or more graphic elements representing information such as, but not limited to, a temperature inside and/or outside of vehicle 102, a speed of vehicle 102, and/or a current time.

In yet another aspect, the management component 118 may instruct the HUD component 120 to project one or more graphic elements onto the windshield 104 that represent notifications from a mobile device (e.g., smart phone and/or tablet). For example, the communications device 126 may receive notifications from the mobile device and forward the notifications to the management component 118 via, e.g., the bus. In this aspect, the management component 118 may instruct the HUD component 120 to project one or more graphic elements representing notifications such as, but not limited to, a call notification, an e-mail notification and/or a text notification.

It is to be appreciated that the aforementioned examples of graphic elements are not intended to be limiting and that the management component 118 may instruct the HUD component 120 to project other graphic elements on the windshield 104 that allow the driver of vehicle 102 to continue viewing the road without having to search other locations within the vehicle 102.

At block 420, the method 400 includes determining a content status of one or more projected graphic elements. In an aspect, the management component 118 may be operatively connected to the HUD component 120 and may determine a content status of the one or more graphic elements being projected by the HUD component 120 at, e.g., block 410. In an aspect, for example, the management component 118 may determine a level of contrast between the one or more graphic elements and the environment of vehicle 102, a degree of animation of the one or more graphic elements, a size of the one or more graphic elements, and/or a number of graphic elements being projected by the HUD component 120. The management component 118 may also determine other parameters that may be indicative of a level of driver distraction caused by the one or more graphic elements projected by the HUD component 120.

At block 430, the method 400 includes detecting one or more objects within an environment of a vehicle. In an aspect, for example, the one or more sensor components 116 of vehicle 102 may detect one or more objects such as, but not limited to, buildings, landmarks, pedestrians, other vehicles, obstructions, obstacles, debris, potholes, road surface conditions, traffic conditions, and/or traffic signs in the environment of vehicle 102. The one or more sensor components 116 may be operatively connected to the management component 118 and may report the one or more detected objects to the management component 118. The one or more detected objects may include objects that were detected by sensor component 116 prior to projecting the one or more graphic elements at, e.g., block 410. The one or more detected objects, however, may not have been previously projected by the HUD component 120 because, for example, the type and/or class of the one or more detected objects may not have been included in the default setting stored in memory 124. Additionally, or alternatively, the one or more detected objects may include objects that were not previously detected by sensor component 116 at, e.g., block 410. For example, the sensor component 116 may detect that an object (e.g., pedestrian, bicyclist, and/or vehicle) has moved within the alert distance. In another example, the sensor component 116 may detect that a status of a traffic light in the environment of vehicle 102 has changed, e.g., from red to green, or vice versa.

At block 440, the method 400 includes alerting the driver of vehicle 102 of the one or more objects detected by the one or more sensor components 116 at, e.g., block 430 when the content status determined at, e.g., block 420 satisfies the distraction criterion. In an aspect, for example, the management component 118 may instruct the HUD component 120 to project one or more additional graphic elements related to one or more detected objects when the content status satisfies the distraction criterion. In an aspect, the management component 118 may determine the content status satisfies the distraction criterion when, for example, the level of contrast, the degree of animation, the size, and/or the number of the one or more graphic elements being projected by the HUD component 120 meets or exceeds the threshold. In an aspect, if the content status satisfies the distraction criterion, then the management component 118 may instruct the HUD component 120 to project the one or more graphic elements related to the one or more detected objects on the windshield 104. Otherwise, if the content status does not satisfy the distraction criterion, then the management component 118 may not instruct the HUD component 120 to project the one or more additional graphic elements related to the one or more detected objects on the windshield 104.

For example, the HUD component 120 may be projecting a notification (e.g., text "YIELDING") over at least one pedestrian detected by sensor component 116 to the right of vehicle 102. The HUD component 120, however, may not be projecting a graphic element over a bicyclist approaching vehicle 102 from the left because the sensor component 116 determined that the bicyclist is located at a distance greater than the alert distance from vehicle 102. In this example, the management component 118 may determine that the size of the notification over the detected pedestrian exceeds the threshold and thus, the driver may be focusing too much attention on the notification and may not realize that the bicycle is approaching the vehicle 102 from the left. Thus, the management component 118 may instruct the HUD component 120 to project an additional graphic element (e.g., warning) over the bicyclist even though the bicyclist is located at a distance further than the alert distance.

In another example, the HUD component 120 may be projecting a plurality of notifications (e.g., exclamation marks) over a plurality of pedestrians and/or bicyclists. The pedestrians and/or bicyclists may be located, for example, within the alert distance to the left and right of vehicle 102. In this example, the management component 118 may determine that the number of notifications being projected over the plurality of pedestrians and/or bicyclists exceeds the threshold and thus, the driver may be looking in too many different directions and may not realize that, for example, a traffic light in front of vehicle 102 has changed from red to green. Thus, the management component 118 may instruct the HUD component 120 to project an additional graphic element (e.g., text "GREEN LIGHT") over the traffic light.

In yet another example, the HUD component 120 may be projecting the colored left turn arrow on the windshield 104 indicating that an intersection to the left of vehicle 102 is clear. However, the sensor component 116 may detect that another vehicle is now approaching vehicle 102 in the opposite direction. In this example, the management component 118 may determine that the level of contrast of the colored left turn arrow exceeds the threshold and thus, the driver may be focusing too much on the colored left turn arrow and may not realize that the other vehicle is approaching vehicle 102. Thus, the management component 118 may instruct the HUD component 120 to project an additional graphic element (e.g., warning) over the approaching vehicle.

Additionally, or alternatively, in an aspect, the management component 118 may send an auditory warning signal through one or more speakers (not shown) of vehicle 102 when the content status of HUD component 120 satisfies the distraction criterion.

In yet another aspect, the management component 118 may determine that the HUD component 120 is not projecting any graphic elements (for example, navigation commands) on the windshield 104 at, e.g., block 410. In this aspect, the management component 118 may not instruct the HUD component 120 to project the one or more additional graphic elements related to the one or more detected objects on the windshield 104.

Figure 5:
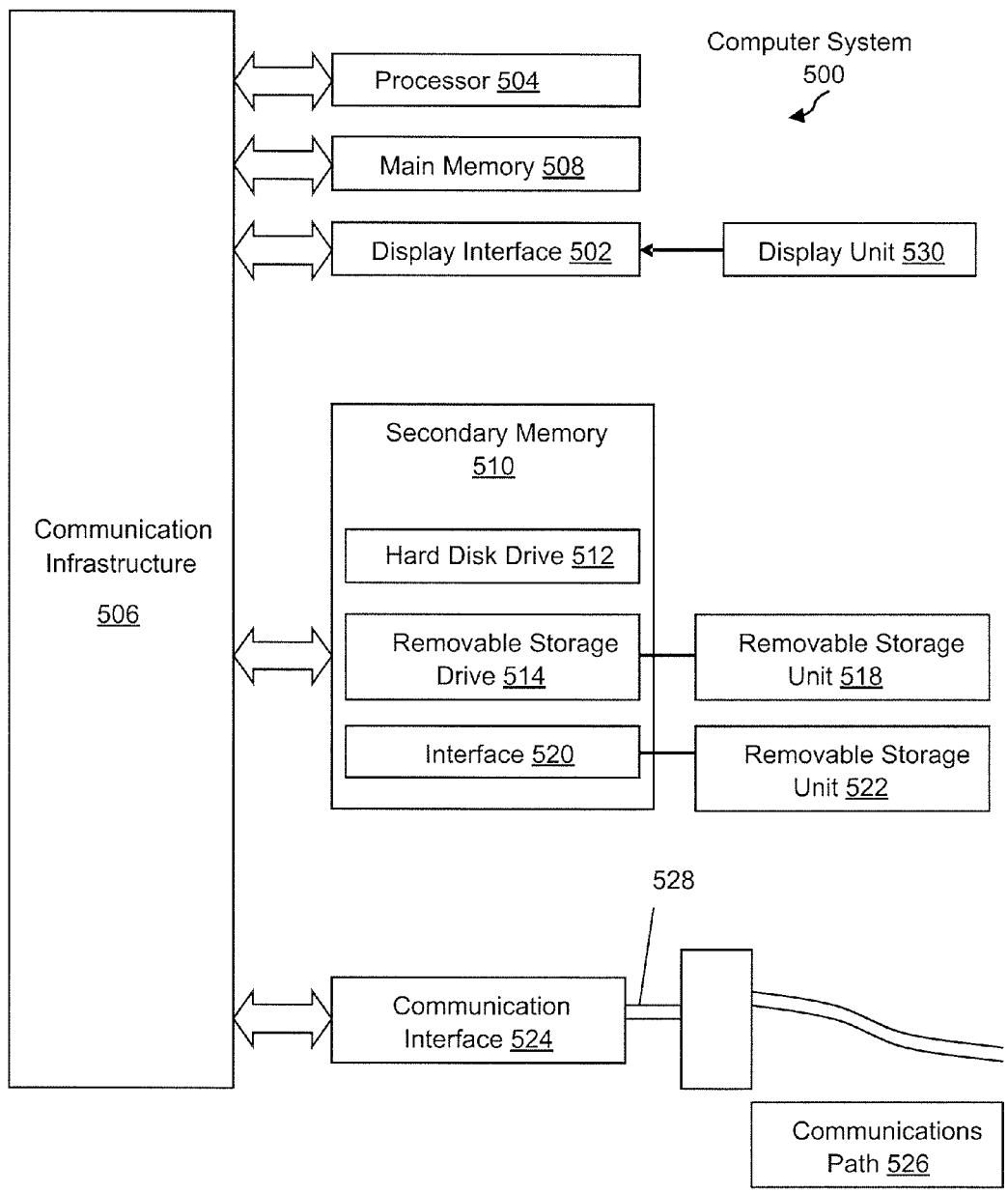
FIG. 5 illustrates an example system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. In an aspect, for example, processor 504 may correspond to processor 122 illustrated in FIG. 1. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
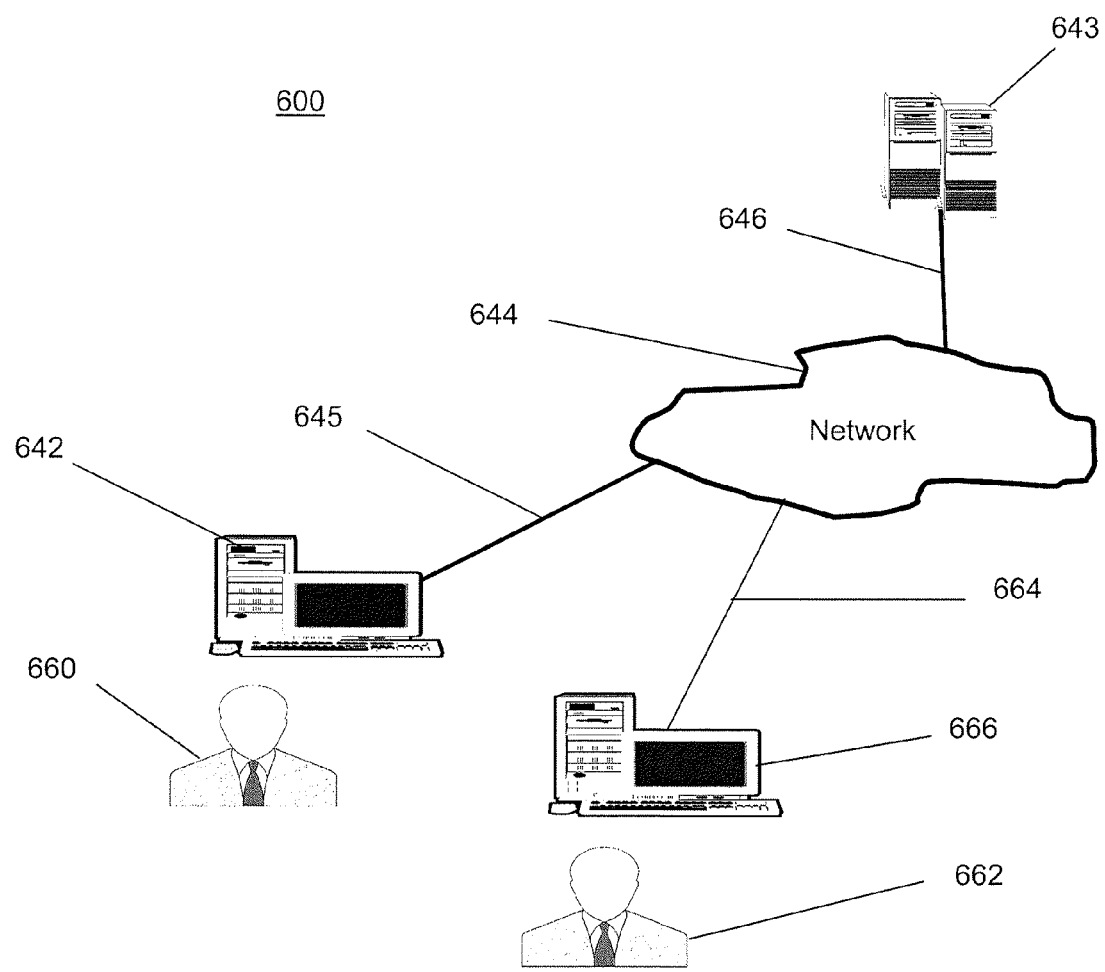
FIG. 6 illustrates a block diagram of various example system components for use in accordance with aspects of the present disclosure.

FIG. 6 is a block diagram of various example system components that may be used in accordance with aspects of the present disclosure. For example, the various components may be within the vehicle 102, or only some of the components may be within the vehicle 102, and other components may be remote from the vehicle 102. The system 600 includes one or more accessors 660, 662 (also referred to interchangeably herein as one or more "users") and one or more terminals 642, 666 (such terminals may be or include, for example, various features of the vehicle notification system). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for reducing driver distraction, the method comprising:
    projecting, by a head-up display (HUD), a plurality of graphic elements onto a windshield in view of a driver of the vehicle;
    determining a content status of the plurality of projected graphic elements, wherein the determining the content status comprises at least one of determining a level of contrast for each of the plurality of projected graphic elements, determining a degree of animation for each of the plurality of projected graphic elements, or determining a size of each of the plurality of projected graphic elements;
- detecting one or more objects within an environment of the vehicle; and
- notifying the driver of the one or more detected objects when the content status of the plurality of projected graphic elements satisfies a distraction criterion.

2. The method of claim 1, wherein notifying the driver of the one or more detected objects, further comprises:
- notifying the driver of the one or more detected objects when at least one of the level of contrast, the degree of animation, or the size of the plurality of projected graphic elements exceeds a threshold.

3. The method of claim 1, wherein notifying the driver of the one or more detected objects, further comprises:
- projecting one or more additional graphic elements relating to the one or more detected objects onto the windshield in view of the driver.

4. The method of claim 1, wherein notifying the driver of the one or more detected objects, further comprises:
- outputting a signal indicating a presence of the one or more detected objects.

5. The method of claim 1, wherein:
- the plurality of projected graphic elements include a visual representation of one or more of a navigation instruction, a notification from a mobile device, or information from a dashboard of the vehicle.

6. The method of claim 1, wherein:
- the one or more detected objects include one or more of a pedestrian, a traffic light, a stop sign, or another vehicle.

7. A vehicle system for reducing driver distraction, the vehicle system comprising:
- a head-up display (HUD) for projecting one or more graphic elements onto a windshield in view of a driver of the vehicle;
- at least one sensor for detecting one or more objects within an environment of the vehicle;
- a memory for storing instructions; and
- a processor communicatively coupled to the HUD, the at least one sensor, and the memory, wherein the processor executes the instructions to:
  - determine a content status of the plurality of graphic elements projected by the HUD, wherein the determining the content status comprises at least one of determining a level of contrast for each of the plurality of projected graphic elements, determining a degree of animation for each of the plurality of projected graphic elements, or determining a size of each of the plurality of projected graphic elements; and
  - notify the driver of the one or more objects detected by the at least one sensor when the content status of the plurality of projected graphic elements satisfies a distraction criterion.

8. The vehicle system of claim 7, wherein to notify the driver of the one or more detected objects, the processor further executes the instructions to:
- notify the driver of the one or more detected objects when at least one of the level of contrast, the degree of animation, or the size of the plurality of projected graphic elements exceeds a threshold.

9. The vehicle system of claim 7, wherein to notify the driver of the one or more detected objects, the processor further executes the instructions to:
- project, via the HUD, one or more additional graphic elements relating to the one or more detected objects onto the windshield in view of the driver.

10. The vehicle system of claim 7, further comprising:
- a speaker communicatively coupled to the processor, wherein, to notify the driver of the one or more detected objects, the processor further executes the instructions to:
  - output, via the speaker, a signal indicating a presence of the one or more detected objects.

11. The vehicle system of claim 7, wherein:
- the one or more graphic elements include a visual representation of one or more of a navigation instruction, a notification from a mobile device, or information from a dashboard of the vehicle.

12. The vehicle system of claim 7, wherein:
- the one or more detected objects include one or more of a pedestrian, a traffic light, a stop sign, or another vehicle.

13. A non-transitory computer-readable medium, comprising:
- code for projecting one or more graphic elements onto a windshield in view of a driver of the vehicle;
- code for determining a content status of the plurality of projected graphic elements, wherein the determining the content status comprises at least one of determining a level of contrast for each of the plurality of projected graphic elements, determining a degree of animation for each of the plurality of projected graphic elements, or determining a size of each of the plurality of projected graphic elements;
- code for detecting one or more objects within an environment of the vehicle; and
- code for notifying the driver of the one or more detected objects when the content status of the plurality of projected graphic elements satisfies a distraction criterion.

* * * * *